United States Patent [19]

Prudhon et al.

[11] 4,267,131

[45] May 12, 1981

[54] METHOD FOR INTIMATE CONTACTING OF PLURAL PHASES AND PHASE CONTACTOR APPARATUS THEREFOR

[75] Inventors: Francois Prudhon, Versailles; Augustin Scicluna, Aubervilliers, both of France

[73] Assignee: Rhone-Poulenc Industries, Paris, France

[21] Appl. No.: 13,295

[22] Filed: Feb. 21, 1979

Related U.S. Application Data

[63] Continuation of Ser. No. 872,151, Jan. 25, 1978, abandoned, which is a continuation-in-part of Ser. No. 770,802, Feb. 22, 1977, which is a continuation of Ser. No. 479,774, Jun. 17, 1974, abandoned.

[30] Foreign Application Priority Data

Jan. 25, 1977 [FR] France ............................... 77 02015

[51] Int. Cl.³ .............................................. B01F 3/04
[52] U.S. Cl. ........................................ 261/153; 34/22; 159/4 B; 159/48 R; 239/406; 261/78 A; 261/79 A; 261/115; 261/116; 423/304
[58] Field of Search .............. 261/76, 79 A, 115–118, 261/DIG. 54, DIG. 75; 55/235–238, 257 R; 239/403, 405, 406; 34/22; 159/4 B, 4 E, 48 R; 106/109; 431/173; 423/304

[56] References Cited

U.S. PATENT DOCUMENTS

| | | | |
|---|---|---|---|
| 1,183,098 | 5/1916 | Merrell et al. ................. | 261/79 A X |
| 2,887,390 | 5/1959 | Coulter et al. ................... | 159/4 B X |
| 3,039,107 | 6/1962 | Bradford ............................ | 159/4 B |
| 3,110,444 | 11/1963 | Eakins ................................ | 159/4 B |
| 3,177,634 | 4/1965 | Latham, Jr. et al. ......... | 261/79 A X |
| 3,231,413 | 1/1966 | Berquin ............................. | 159/4 E |
| 3,275,063 | 9/1966 | Tailor ................................. | 261/118 X |
| 3,284,169 | 11/1966 | Tominaga et al. ............ | 261/79 A X |
| 3,406,953 | 10/1968 | Moore ............................... | 261/79 A |
| 3,412,529 | 11/1968 | Tailor ............................ | 261/79 A X |

FOREIGN PATENT DOCUMENTS 869143  5/1961  United Kingdom .................... 159/4 B Primary Examiner—Richard L. Chiesa
Attorney, Agent, or Firm—Burns, Doane, Swecker & Mathis

[57] ABSTRACT

Intimate contacting of plural, physically disparate phases is achieved by establishing a current of axially extending, axially symmetrical helical flow of a first phase; separately establishing a current of coaxially extending, rectilinear flow of a physically disparate second phase, the currents of said first and said second phases being maintained physically separated from each other; circulating and directing said currents which comprise the plural phases to a zone of restricted flow passage with respect to said helical flow, whereby said plural currents converge and are intimately, homogeneously admixed and whereas such zone of convergence the momentum of the first phase helical flow is at least 100 times greater than the momentum of the second phase, coaxial rectilinear flow; and thence abruptly changing the velocity field of at least one of said plural phases, while at the same time maintaining the general direction of flow of said admixed plural phases, and whereby phase separation of the product of admixture results enabling easy recovery thereof. Such intimate contacting is especially desirable for concentrating dilute solutions of phosphoric acid with hot air.

33 Claims, 5 Drawing Figures

METHOD FOR INTIMATE CONTACTING OF PLURAL PHASES AND PHASE CONTACTOR APPARATUS THEREFOR

CROSS-REFERENCE TO RELATED APPLICATIONS

This is a continuation, of application Ser. No. 872,151, filed Jan. 25, 1978 now abandoned, which is a continuation-in-part of our copending earlier filed application, Ser. No. 770,802, filed Feb. 22, 1977, itself a continuation of our Ser. No. 479,774, filed June 17, 1974, now abandoned. Other related applications include our Ser. No. 770,053, filed Feb. 18, 1977, now U.S. Pat. No. 4,124,353 [a continuation of Ser. No. 590,812, filed June 27, 1975, now abandoned], and Ser. No. 591,333 filed June 30, 1975, now U.S. Pat. No. 4,086,099.

BACKGROUND OF THE INVENTION

1. Field of the Invention

The present invention relates to the intimate contacting or admixture of a plurality of distinct physical phases, and plural phase contactor therefor; more especially, the invention relates to the intimate contacting of plural, distinct physical phases and ultimate separation of the various products resulting from such admixture.

2. Description of the Prior Art

A great variety of gas/liquid, and other phase contactors, mixers or separators, whether of pneumatic, mechanical, or other type, are of course well known to the state of this art. Equally well known, on the other hand, is the art appreciation of the various difficulties that are encountered in attempting to disperse, disintegrate, comminute or pulverize, e.g., a liquid in a gaseous environment or treatment phase, such as, for example, effecting the drying of certain liquid materials through a spray drying technique. An ideal dryer of this type would comprise a vertical, cylindrical contact zone in which the gas and the dispersed liquid droplets are uniformly, regularly distributed, with the liquid being dispersed or entrained therein in the form of substantially equally sized droplets. Ideally, all of the droplets would follow the same flow path through the apparatus as to be subjected to the same treatment and, accordingly, to continuously give rise to the formation of identical product. Stated differently, the entire volume of the physical phase to be treated, in this spray drying event the same being a dispersed liquid droplet phase, should be subjected to the same historical profile operationally in order to receive an essentially identical amount and duration of treatment by the treatment medium or phase, under the same conditions [especially those of temperature and concentration]. And the immediately aforesaid of course presupposes or implies the realization or attainment of a precisely, indeed near perfectly controlled rate of flow.

In our copending application, Ser. No. 770,802, filed Feb. 27, 1977 [a continuation of our abandoned parent application, Ser. No. 479,774, filed June 17, 1974], it has been shown that certain conditions very close to the ideal can be attained by insuring flow or distribution of vortex type, by operating within certain well defined parameters of both geometry and kinetics. As disclosed in the noted application Ser. No. 770,802 [hereby expressly incorporated by reference in its entirety and relied upon], in an initial stage in the process the plural phases are manipulated upstream of their convergence by supplying same to a cylindrical distribution zone, at least one of the phases being introduced via a helical trajectory inducing inlet and being axially extended, while maintained in an axially symmetrical, helical flow path, through said distribution zone. By "axially symmetrical, helical flow path", there is denoted a regularly repeating, helical path of axially extending downward flow which is essentially symmetrical with respect to at least one plane containing the axis of such helical flow. At least one other phase is also introduced to the distribution zone, via suitable inlet and it too is axially extended therethrough, but in this instance the path of downward flow is essentially rectilinear. The longitudinal axis of the path of rectilinear flow is, moreover, coaxial with the longitudinal axis of the path of helical flow. The current of circulating helical flow next progresses to a confining zone of restricted flow passage so constructed that the minimum momentum of the helical flow is at least 100 times greater than the momentum of the coaxial rectilinear flow, and such that the plural flow paths or separately supplied phases converge and are combined, blended and admixed in yet a third distinct zone, the contact zone. Thus, the trajectory imparted by the helical flow, at its point of exit from the zone of restricted flow passage, forms one of the classes of generatrices of a hyperboloid to a thin surface, or, more correctly, a layered stack of a plurality of hyperboloids. Said generatrices are conveyed through a series of circles to form a ring of narrow width which is situated downstream of the restricted passage for the helical flow, but upstream of its divergence. This ring surrounds a zone of depression, the effects of which are manifested both upstream, on the phase constituting rectilinear flow, as well as downstream, on the phase constituting circulating helical flow, by effecting the recycling of a portion of such fluids. In this fashion, in the zone downstream from the area of combining or convergence of the separately supplied fluids or plural flow paths, and in the same plane which is perpendicular to their coaxis all vectors of velocity of the individual elements constituting total volume are equal in absolute value, are divergent and are mutually subtracted upon rotation about the coaxis; hence, at two successive intervals, two distinct units of volume in the same trajectory evidence the same historical processing profile, thus assuring maintenance of contact between the two phases. Accordingly, if the rectilinear flow, for example, be constituted of a liquid phase and the helical flow of a gaseous phase, the liquid phase will be disintegrated, fractionated or atomized into a multitude of droplets, with each droplet being dispersed in a given volume of the gas and subjected to a certain movement or velocity thereby, by being physically swept along with said gas, thus creating the effect of centrifugation; this phenomenon enhances contact with the vector gas and, in those cases where combustion results, insures ignition and flame stability. Such a process, therefore, is a notably marked advance in the art of rapid intimate contact between two disparate phases. Nonetheless, a product separation problem arises, for example, the elimination of gases from any solid or liquid phase recovered. In our aforementioned application, Ser. No. 770,802, this function of separation is assured by means of a cyclone. Unfortunately, though, such a device has considerable space requirements and if it be necessary that a predetermined efficiency be attained, utilization of such a device fosters a substantial cost increase, even without taking into account energy loss. Modification of the cyclone itself has also been proposed to alleviate such problems, for example, by placing helical guide vanes or the like inside the cyclone. But, as can be seen from, e.g., Perry and Chilton, *Chemical Engineers' Handbook,* 5th Edition, pp. 20-86, McGraw-Hill Book Co., such vanes or the like, when placed inside the cyclone, will have a detrimental effect on performance of the unit because of reduced pressure throughout and a correspondingly even greater reduction in collection, or product recovery, efficiency.

SUMMARY OF THE INVENTION

Surprisingly, it has now been determined that if a cylindrical wall member be integrally secured to the trajectories or outlet of the contact zone of any device disclosed in our copending application, Ser. No. 770,802, and an abrupt change or variation in the velocity field of at least one of the plural phases be effected thereby, while at the same time maintaining the general direction of flow of said phases, excellent phase separation is obtained, even though a device of but small dimensions is used and without encountering those inconveniences or disadvantages which result from the modification of the known and classical cyclones by insertion of helical guide vanes or the like.

DETAILED DESCRIPTION OF THE INVENTION

Figure 1:
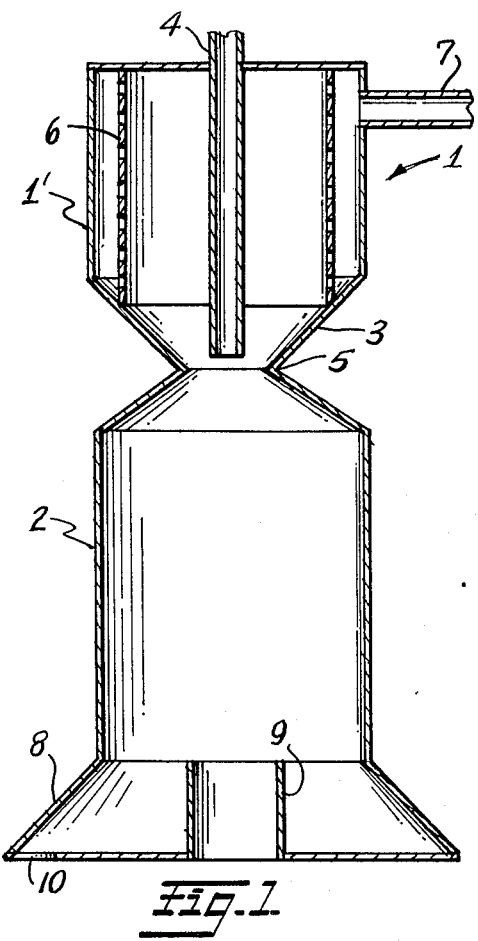
FIG. 1 is an axial, diagrammatical cross-sectional view of one embodiment of a phase contactor according to the invention.

More particularly according to the invention, there are provided both apparatus and process for the formation of an intimate, homogeneous product mix comprising at least two disparate physical phases, and for the ultimate facile separation and recovery of the various products resulting from such mixing. According to the invention an intimate, homogeneous admixture of said phases is assured by mutually contacting the same by means of a flow of vortex type. This is accomplished by supplying at least one of the phases to a first cylindrical distribution zone via a helical trajectory inducing inlet, and whereby the same is axially extended through such zone while being maintained in an axially symmetrical, helical flow path. By "axially symmetrical, helical flow path", here too is intended a regularly repeating, helical path of axially extending downward flow which is essentially symmetrical with respect to at least one plane containing the axis of the helical flow. At least one other phase is also introduced to this first distribution zone, via suitable inlet, and it too is axially extended therethrough, but in this instance the path of downward flow is essentially rectilinear. The longitudinal axis of the path of rectilinear flow is, moreover, coaxial with the longitudinal axis of the path of helical flow. The current of circulating helical flow next progresses to a confining zone of restricted flow passage so constructed that the minimum momentum of the helical flow is at least 100 times greater than the momentum of the coaxial rectilinear flow, and such that the plural flow paths of separately supplied phases converge and are combined, blended and admixed in yet a third distinct zone, the contact zone. In the contact zone, the trajectories common to the different phases are directed against a cylindrical surface, the intimate admixture remaining in contact with said surface as a result of the effects of that centrifugal force imparted to the system by means of the circulating, helical flow. Phase separation is next effected by an abrupt change in the field of velocities of at least one of the disparate phases, while at the same time maintaining the general direction of flow of the several phases. Ultimately, the products resulting from the intimate admixture or contacting of the various phases are recovered separately. The plural phases subjected to treatment according to the invention may be either gaseous, liquid or solid phases. For example, the concentration of a gas/liquid admixture is readily effected, as are (i) the drying of a gas/solid mixture, (ii) the decantation of two immiscible liquids, and (iii) the absorption washing of a gas with a liquid; the invention is particularly worthwhile for the single step concentration of dilute solutions of phosphoric acid.

Typically, the kinetics of the procedure according to the present invention are tantamount to those described in our aforesaid application, Ser. No. 770,802, namely, the minimum momentum of the helical flow is at least 100 times greater than the momentum of the coaxial rectilinear flow.

The abrupt field or variation in the range of velocities of at least one of the disparate phases is conveniently and practically achieved by mere abrupt change in the direction of the helical flow. The abrupt change in direction may also be effected by substantial variation in the cross-section of the downstream zone of cylindrical flow. Also, if a particular treatment be carried out according to the invention, such as, for example, a concentration, yet another treatment or processing parameter may be added thereto or combined therewith, e.g., an additional thermal or chemical treatment; any thermal treatment may be effected by a given phase, per se.

The apparatus according to the invention may easily be fabricated, simply by adding or securing to the contactor disclosed in the noted 770,802 application, [1] a vertical, cylindrical wall member integral therewith and axially downstream therefrom and in communicating relationship therewith, and defining a phase separation zone, [2] a base member, said base member having a cross-section which is greater in diameter than the diameter of the cylinder [1] defining the phase separation zone, and also being integral and in communicating relationship therewith, said base member comprising [3] an outlet or evacuating conduit for the lightest of the plural phases, with the upstream or inlet end of such conduit or duct being disposed essentially planar with, or at the height of the point of integral junction between the cylindrical wall member [1] and the base member [2]. The angle of juncture between the cylindrical wall member and the base member having the greater diameter cross-section may vary over considerably wide limits.

In another embodiment of the invention, apparatus otherwise identical to that immediately above-described may be utilized, except that the base member may itself have a cross-section which is identical to that of the vertical, cylindrical wall member. The base member may be, for example, itself cylindrical, in which case it can be directly, integrally attached to the cylindrical wall member by means of any suitable sleeve, but the same may also be of slightly greater or lesser cross-section and thus directly integrally attached to the cylindrical wall member, for example, by force-fit, suitable gasket and nuts and bolts, or other securing means.

The contactor of the invention too may be comprised of a variety of other elements, such as one or more hoppers and various conduits defining both inlets and outlets for the introduction and removal of the various plural phases. For the sake of simplicity and brevity, that device according to the copending application, Ser. No. 770,802, shall hereinafter be referred to as the "head" of the subject contactor. Such a head conveniently comprises an at least partially cylindrical casing or tubular wall member terminating at its downside end either (i) in a truncated cone, the smaller base of which defining the downstream outlet of the distribution zone [as well as defining the confining zone of restricted flow passage], or (ii) terminating in a centrally apertured flat disc or plate, said central aperture being both circular and coaxial with the casing or tubular wall member. The circular aperture, in this embodiment, also defines the confining zone of restricted flow passage. The upstream end of the casing or tubular wall member is sealed, but has extending therethrough and deep within the casing an internal conduit or pipe member which is coaxial with the tubular casing, and which terminates in an outlet aperture which is spaced from the mean plane of the circular aperture defining the confining zone of restricted flow passage by a length or distance which is between 0 and the radius of said zone of restricted flow passage. The head also comprises a helical trajectory inducing inlet for one of the phases, and means for axially extending the flow from such inlet completely through that interspace thus established between the inner walls of the tubular casing and the outer walls of the coaxial, internal tubular conduit, while at the same time being maintained in an axially symmetrical, helical flow path.

The coaxial, internal tubular conduit or pipe may itself envelop yet one or more additional coaxial, concentric tubular conduits, for example, where necessary to rectilinearly charge several fluids which should be kept out of mutual contact or admixture with each other prior to their contact or admixing with the helical flow current.

It is, nonetheless, highly essential that the helical flow be maintained axially symmetrical, i.e., a regularly repeating, helical path of axially extending downward flow which is essentially symmetrical with respect to at least one plane passing through the axis of the helical flow. In the case of a contactor having relatively small dimensions, this object is conveniently attained by utilizing more than one helical trajectory inducing inlet, but, advantageously, the wall member defining the first distribution zone simply comprises a perforated, at least partially cylindrical or frusto-conical element fitted within an outside enveloping continuous jacket adapted to, and receiving a tangential, helical trajectory inducing inlet. The apertures or orifices comprising such an element are necessarily "thin-walled orifices". It too is important that the distribution of such orifices or apertures be regular and that the surface area of the orifices be such that the perforate wall, in the majority of cases, does not induce a pressure drop of greater than about 50 $g/cm^2$ in the fluid flow; a flow rate of 35 $m^3/h$ through an aperture 20 mm in diameter, for example, is easily obtainable. Cf. our copending application, Ser. No. 770,802.

In a particularly advantageous embodiment according to the invention, the diameter of the outlet or evacuating conduit comprising the base member is at least two thirds of the diameter of the cylindrical wall member defining the phase separation zone.

Figure 5:
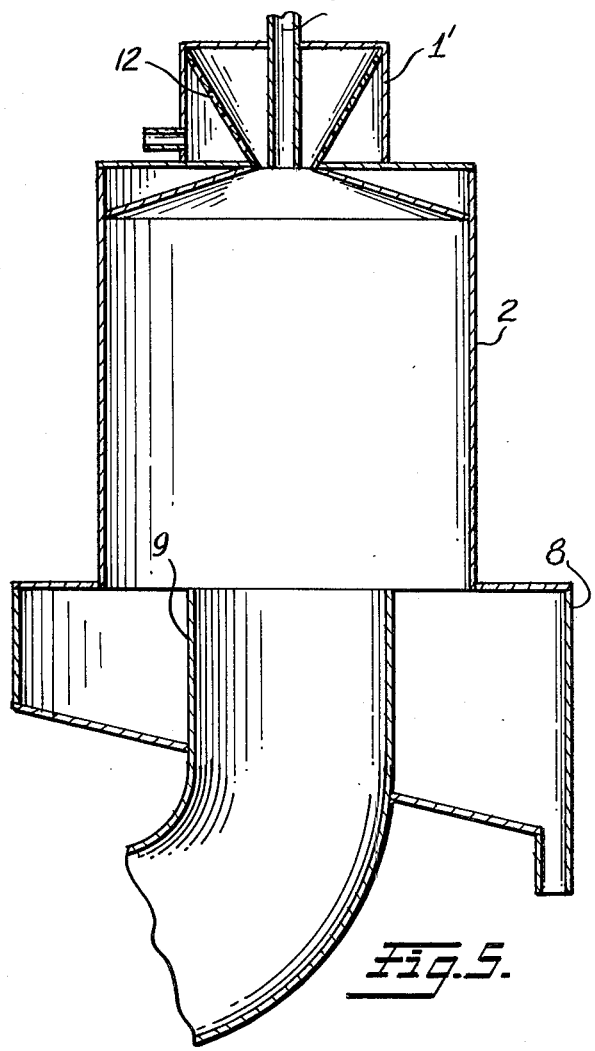
FIG. 5 is an axial, diagrammatical cross-sectional view of another phase contactor according to the invention.

Referring specifically to the Figures of Drawing, in FIGS. 1 and 5 are illustrated, in axial, diagrammatic cross-sections, two different embodiments of a contactor according to the invention. The FIG. 1 depicts a contactor according to the invention consisting essentially of the "head" 1, a vertical, cylindrical wall member 2 defining the phase separation zone, and a base member 8. The head 1 comprises a contactor according to our copending application, Ser. No. 770,802, and includes an inverted, truncated cone 3 downwardly depending from the cylindrical casing 1'. Coaxial therewith is the internal tubular conduit or pipe 4, the same coaxially extending through the upside end of the casing 1' and deep within the truncated cone 3, said truncated cone 3 terminating in an outlet 5 or confining zone of restricted flow passage. A perforated inner wall member 6 enables the establishment of a regularly repeating, helical path of axially extending downward flow which is essentially symmetrical with respect to at least one plane passing through the axis of the helical flow, such flow being established by means of the helical trajectory inducing inlet 7 for one of the phases. The vertical, cylindrical wall member 2 is integral with the head 1, is axially downstream therefrom and in communicating relationship therewith, and defines a second distribution or phase separation zone. Base member 8 is integral with said wall member 2 and is outwardly flared toward its ultimate base. The base member 8 comprises an outlet or evacuating conduit 9 for the lightest of the plural phases, with the upstream or inlet end of such conduit or duct 9 being disposed essentially planar with, or at the height of the point of integral junction [e.g., a weld] between the cylindrical wall member 2 and the base member 8. The heaviest of the plural phases is withdrawn through any suitable outlet or orifice 10.

Figure 2:
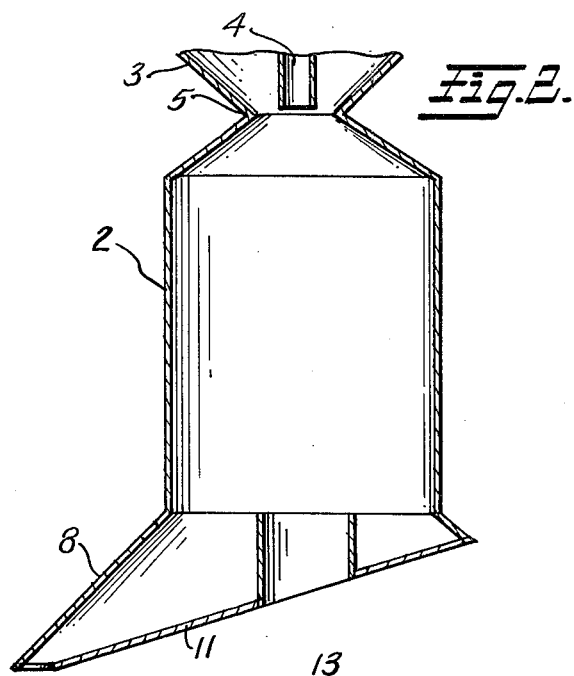
FIG. 2 is an axial, diagrammatical cross-sectional view of the downside elements of the phase contactor as shown in FIG. 1, but reflecting an alternate construction for the base member 8.

FIG. 2 depicts a contactor tantamount to that of FIG. 1, save that the base member 8 includes an ultimate base 11 which is in a plane oblique to the vertical axis of the cylinder 2.

Figure 3:
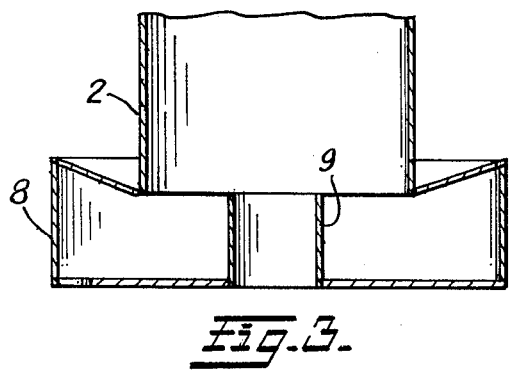
FIG. 3 is also an axial, diagrammatical cross-sectional view of the downside elements of the phase contactor as shown in FIG. 1, but reflecting another alternative construction for the base member 8.
Figure 4:
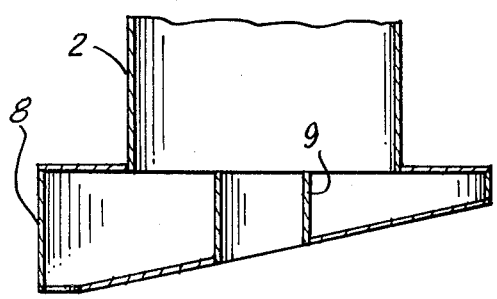
FIG. 4 is another axial, diagrammatical cross-sectional view of the downside elements of the phase contactor as shown in FIG. 1, but reflecting yet another alternative construction for the base member 8.

Yet another contactor tantamount to that shown in FIG. 1, but also differing in the construction of the base member 8, is shown in the FIG. 3. But in this embodiment the base member flares outwardly towards its top, rather than towards its base, while, as in FIG. 1, its base is perpendicular to the vertical axis of the cylindrical wall 2. A similar embodiment is shown in the FIG. 4, but with the top of the base member being normal to the cylinder 2, but being provided with an obliquely planar base.

In order to further illustrate the present invention and the advantage thereof, the following specific examples are given, it being understood that the same are intended only as illustrative and in nowise limitative. In each of the following examples, there is outlined a process for the concentration of dilute solutions of phosphoric acid by means of hot air, and also in each that apparatus as illustrated in FIG. 5 of the drawings was utilized. In the FIG. 5 embodiment, the head 1 had a diameter of 35 mm, and the confining zone 5 of restricted flow passage was 15 mm in diameter. The height of the head was 42 mm, and the largest diameter of the inverted, truncated cone 12 was 30 mm. The liquid phase was charged via the conduit 13 having a diameter downstream from the point of inlet of 4 mm. The cylindrical, phase separation zone 2 had a diameter of 80 mm and a height of 100 mm, while the base member 8 was 120 mm in diameter. The diameter of the outlet or evacuating conduit 9 was 60 mm.

Each example was performed under the conditions listed in the following Table I:

TABLE I

| Example | Air Flow Rate ($m^3$ N/h) | Air Pressure in Torrs | Temperature of Inlet Air (°C.) | Temperature of outlet air (°C.) |
|---|---|---|---|---|
| 1 | 26 | 1.3 | 750 | 300 |
| 2 | 26 | 1.3 | 750 | 210 |
| 3 | 26 | 1.3 | 750 | 180 |
| 4 | 26 | 1.3 | 750 | 140 |

In each example, the initial concentration of the dilute solution of phosphoric acid was an acid having a $P_2O_5$ content of 25%. During the concentration process, no apparent formation of any droplets was observed. The following results was obtained:

TABLE II

| Example | % ortho acid (expressed in % of $P_2O_5$) |
|---|---|
| 1 | 62 |
| 2 | 52 |
| 3 | 38 |
| 4 | 34 |

The foregoing examples clearly illustrate the advantages of the present invention which permits of the easy, single-step concentration of phosphoric acid, while being highly selective with respect to the form in which the resulting product is obtained. In addition, the highly selective process according to the invention produces exceedingly high phosphoric acid concentrations, in but a single stage, and under quite desirable energy conditions. This is indeed important because, for handling and transportation purposes, the orthophosphoric form of the acid is greatly preferred. It too will be appreciated that the process of the invention is characterized in that any droplets are obtained by a transfer in momentum, whereby the rectilinear flow [e.g., a liquid flow] is disintegrated, dispersed and thence subjected to the action of the gaseous, helical flow due to the fact that the momentum of the helical flow is quite important vis-a-vis the momentum of the various elements comprising the rectilinear flow [in contradistinction to the known processes bottomed on atomization]. And, due to the fact that the helical flow paths at outlet define a layered stack of a plurality of hyperboloids, the contactor according to the invention can even by considered as a plug reactor [each droplet being taken in charge by a certain volume of gas].

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the intimate contacting of plural, physically disparate phases, comprising (i) establishing a vertically descending current of axially extending, axially symmetrical helical flow of a first gaseous phase, (ii) separately establishing a current of coaxially downwardly vertically extending, rectilinear continuous jet stream of a physically disparate second phase, (iii) maintaining said currents of said first and said second phases physically separate from each other, (iv) circulating and directing said currents which comprise the plural phases to a zone of restricted flow passage with respect to said helical flow, (v) at said zone of restricted flow passage, converging and intimately, homogeneously admixing said plural currents, and disintegrating into a multitude of droplets and entraining said rectilinear jet stream current within said helical current of gaseous flow, and maintaining at such zone of convergence a momentum of the first phase helical flow of at least 100 times greater than the momentum of the second phase, coaxial rectilinear jet stream, (vi) concurrently establishing a flow defining a layered horizontal stack of a plurality of hyperboloids by means of the trajectory of said helical current of gaseous flow, which, at a point downstream from said zone of restricted flow passage coestablishes a zone of narrower width than said zone of restricted flow passage, thus circumscribing a zone of depression, and thence (vii) diverging and abruptly changing the velocity of at least one of said plural phases, while at the same time maintaining the general direction of flow of said admixed plural phases, and whereby phase separation of the product of admixture results.

2. The process as defined by claim 1, wherein the steps (i) and (ii) there are established currents of flow which are axially, vertically downward.

3. The process as defined by claim 1, said zone of depression effecting a recycling of each current of flow.

4. The process as defined by claim 3, wherein the helical flow is gaseous and the rectilinear flow is liquid.

5. The process as defined by claim 4, wherein the liquid flow is disintegrated into a multitude of droplets, said droplets being entrained by and swept along within the gaseous flow.

6. The process as defined by claim 3, wherein the contact zone the trajectories common to the different phases are directed against a cylindrical surface.

7. The process as defined by claim 3, wherein the abrupt change in velocity field is effected by a substantial change in the cross-section of the area of downward flow.

8. The process as defined by claim 3, wherein at least two separate physical, chemical or combined physical/chemical treatments are effected by means of the intimate contacting.

9. The process as defined by claim 3, wherein the disparate phases comprise a gas and a liquid.

10. The process as defined by claim 9, wherein the gas is hot air and the liquid is dilute phosphoric acid.

11. The process as defined by claim 3, wherein the disparate phases comprise a gas and a solid.

12. The process as defined by claim 11, wherein the intimate contacting results in a drying of one of the plural phases.

13. The process as defined by claim 3, wherein the disparate phases comprise two immiscible liquids.

14. The process as defined by claim 3, wherein the intimate contacting results in a concentration of one of the plural phases.

15. The process as defined by claim 3, further including recovering the product of admixture.

16. The process as defined by claim 3, wherein the intimate contacting effects a thermal treatment.

17. A process for the intimate contacting of plural, physically disparate phases, consisting essentially of (i) establishing a vertically descending current of axially extending, axially symmetrical helical flow of a first gaseous phase, (ii) separately establishing a current of coaxially downwardly vertically extending, rectilinear continuous jet stream of a physically disparate second phase, (iii) maintaining said currents of said first and said second phases physically separate from each other, (iv) circulating and directing said currents which comprise the plural phases to a zone of restricted flow passage with respect to said helical flow, (v) at said zone of restricted flow passage, converging and intimately, homogeneously admixing said plural currents, and disintegrating into a multitude of droplets and entraining said rectilinear jet stream current within said helical current of gaseous flow, and maintaining at such zone of convergence a momentum of the first phase helical flow of at least 100 times greater than the momentum of the second phase, coaxial rectilinear jet stream, (vi) concurrently establishing a flow defining a layered horizontal stack of a plurality of hyperboloids by means of the trajectory of said helical current of gaseous flow, which, at a point downstream from said zone of restricted flow passage coestablishes a zone of narrower width than said zone of restricted flow passage, thus circumscribing a zone of depression, and thence (vii) diverging and abruptly changing the velocity of at least one of said plural phases, while at the same time maintaining the general direction of flow of said admixed plural phases, and whereby separation of the product of admixture results.

18. A phase contactor for the intimate contacting of plural, physically disparate phases, which comprises (i) a distribution zone, said distribution zone being comprised of means for establishing a vertically descending current of axially extending, axially symmetrical helical flow of a first gaseous phase, means for separately establishing a current of coaxially downwardly vertically extending, rectilinear continuous jet stream of a physically disparate second phase, and means for insuring physical separation from each other of said currents of said first and second phases, (ii) a contact zone, said contact zone being comprised of a zone of restricted flow passage with respect to the means for establishing the helical flow, means for the convergence and intimate homogeneous admixture of the separately supplied disparate phases, means for imparting a momentum to the gaseous first phase helical flow which is at least 100 times greater than the momentum of the second phase, coaxial rectilinear flow, means for disintegrating into a multitude of droplets and entraining said rectilinear jet stream current within said helical current of gaseous flow, means for concurrently establishing a flow defining a layered horizontal stack of a plurality of hyperboloids via the trajectory of said helical current of gaseous flow, and means for establishing, at a point downstream from said zone of restricted flow passage, a flow zone of narrower width than said zone of restricted flow passage, same also circumscribing a zone of depression, and (iii) a phase separation zone, said phase separation zone being comprised of means for abruptly changing the velocity of at least one of said plural phases, means for maintaining the general direction of flow of said admixed plural phases, and means for effecting phase separation of the product of admixture of said plural phases.

19. The phase contactor as defined by claim 18, wherein the means for establishing the current of rectilinear flow comprises an internal pipe member.

20. The phase contactor as defined by claim 19, wherein the means for establishing the current of helical flow comprises a vertical, generally cylindrical casing terminating at its downside and in an inverted, truncated cone, said internal pipe member being coaxial therewith.

21. The phase contactor as defined by claim 20, wherein the outlet end of said internal pipe member is spaced from the mean plane of the outlet of the inverted, truncated cone a distance of between 0 and the radius of the outlet of said cone.

22. The phase contactor as defined by claim 21, wherein the cone outlet defines the zone of restricted flow passage.

23. The phase contactor as defined by claim 19, wherein the means for establishing the current of helical flow comprises a vertical, generally cylindrical casing terminating at its downside end in a centrally, circularly apertured flat disc, said aperture being coaxial with the longitudinal axis of the said casing, and said aperture defining the zone of restricted flow passage.

24. The phase contactor as defined by claim 19, the said means for establishing the current of helical flow comprising a helical trajectory inducing inlet.

25. The phase contactor as defined by claim 19, further comprising at least one additional internal pipe member coaxial and concentric with said first internal pipe member, and enveloped thereby.

26. The phase contactor as defined by claim 19, the means for establishing the current of helical flow comprising an apertured wall member disposed within a continuous, enveloping jacket.

27. The phase contactor as defined by claim 18, wherein the phase separation zone comprises a vertical, generally cylindrical wall member coaxial with said distribution zone, downstream therefrom and in communicating relationship therewith.

28. The phase contactor as defined by claim 27, further including a base member (iv) for collection and recovery of the product of admixture of said plural phases.

29. The phase contactor as defined by claim 28, said base member comprising an outlet for the lightest of the plural phases.

30. The phase contactor as defined by claim 29, further comprising an outlet for the heavier of the plural phases.

31. The phase contactor as defined by claim 29, wherein the diameter of outlet is at least two-thirds of the diameter of the generally cylindrical phase separation zone.

32. The phase contactor as defined by claim 18, wherein the several zones define a generally hourglass-shaped configuration.

33. A phase contactor for the intimate contacting of plural, physically disparate phases, consisting essentially of (i) a distribution zone, said distribution zone being comprised of means for establishing a vertically descending current of axially extending, axially symmetrical helical flow of a first gaseous phase, means for separately establishing a current of coaxially downwardly vertically extending, rectilinear continuous jet stream of a physically disparate second phase, and means for insuring physical separation from each other of said currents of said first and second phase, (ii) a contact zone, said contact zone being comprised of a zone of restricted flow passage with respect to the means for establishing the helical flow, means for the convergence and intimate homogeneous admixture of the separately supplied disparate phases, means for imparting a momentum to the gaseous first phase helical flow which is at least 100 times greater than the momentum of the second phase, coaxial rectilinear flow, means for disintegrating into a multitude of droplets and entraining said rectilinear jet stream current within said helical current of gaseous flow, means for concurrently establishing a flow defining a layered horizontal stack of a plurality of hyperboloids via the trajectory of said helical current of gaseous flow, and means for establishing, at a point downstream from said zone of restricted flow passage, a flow zone of narrower width than said zone of restricted flow passage, same also circumscribing a zone of depression, and (iii) a phase separation zone, said phase separation zone being comprised of means for abruptly changing the velocity of at least one of said plural phases, means for maintaining the general direction of flow of said admixed plural phases, and means for effecting phase separation of the product of admixture of said plural phases.

* * * * *